(12) United States Patent
Huang

(10) Patent No.: US 11,713,815 B2
(45) Date of Patent: Aug. 1, 2023

(54) LIQUID CONTROL VALVE AND ADJUSTING ROD AND LIQUID STOPPER THEREOF

(71) Applicant: Ping-Yi Huang, Kaohsiung (TW)

(72) Inventor: Ping-Yi Huang, Kaohsiung (TW)

( * ) Notice: Subject to any disclaimer, the term of this patent is extended or adjusted under 35 U.S.C. 154(b) by 0 days.

(21) Appl. No.: 17/516,886

(22) Filed: Nov. 2, 2021

(65) Prior Publication Data
US 2023/0138823 A1    May 4, 2023

(51) Int. Cl.
*F16K 1/52*    (2006.01)
*F16K 31/52*    (2006.01)

(52) U.S. Cl.
CPC .............. *F16K 1/523* (2013.01); *F16K 31/52* (2013.01)

(58) Field of Classification Search
CPC ........... F16K 31/52; F16K 31/26; F16K 1/523
See application file for complete search history.

(56) References Cited

U.S. PATENT DOCUMENTS

| | | | | |
|---|---|---|---|---|
| 1,047,596 A * | 12/1912 | Webster | ................ | F16K 31/265 |
| | | | | 137/445 |
| 1,826,322 A * | 10/1931 | Mueller | .................. | F16K 31/26 |
| | | | | 137/445 |
| 2,296,219 A * | 9/1942 | Miller | ..................... | F16K 31/26 |
| | | | | 251/74 |
| 2,681,662 A * | 6/1954 | Smith | ..................... | F16K 31/26 |
| | | | | 137/437 |
| 2,847,025 A * | 8/1958 | Reitman | .................. | F16K 31/26 |
| | | | | 137/426 |
| 2011/0226351 A1 * | 9/2011 | Hwang | .................... | F16K 31/26 |
| | | | | 137/446 |

FOREIGN PATENT DOCUMENTS

| | | |
|---|---|---|
| CN | 208474613 U | 2/2019 |
| TW | 201013352 A | 4/2010 |
| TW | M554183 U | 1/2018 |

* cited by examiner

*Primary Examiner* — Daphne M Barry
(74) *Attorney, Agent, or Firm* — Karin L. Williams; Alan D. Kamrath; Mayer & Williams PC

(57) ABSTRACT

A liquid control valve includes a base, a liquid stopper, an adjusting rod, and a linkage. The base includes a first chamber and a second chamber intercommunicating with each other. The base further includes an inner face having an upper stop portion. The liquid stopper includes a valve body movably received in the first chamber and a seal for abutting against the upper stop portion. The adjusting rod includes a fixing arm and an adjusting arm, which are connected to each other by a conical hole and a cone. An end of the fixing arm is pivotably connected to a first pivotal portion of the base. The linkage includes a driving arm and a connecting arm which are pivotably connected. An end of the driving arm is pivotably connected to a second pivotal portion of the base. An end of the connecting arm is pivotably connected to the fixing arm.

10 Claims, 9 Drawing Sheets

LIQUID CONTROL VALVE AND ADJUSTING ROD AND LIQUID STOPPER THEREOF

BACKGROUND OF THE INVENTION

1. Field of the Invention

The present invention relates to a liquid control valve and, more particularly, to a liquid control valve using a float to control a liquid level as well as an adjusting rod and a liquid stopper of the liquid control valve.

2. Description of the Related Art

FIG. 1 shows a conventional liquid control valve 9 used in a liquid container, such as a water tank, a reservoir, etc. The liquid control valve 9 includes a body 91 having an inlet 9a and an outlet 9b. The body 91 includes a flange 911 on an inner periphery thereof. Mounted in the body 91 are a valve rod 92, a seal ring 93, and a seal ring seat 96 as well as a pull rod 94 extending beyond the body 91. A float rod 95 is connected to an outer periphery of the body 91 and includes an end having a float 951 floating on the liquid level. An adjusting device is disposed between the float rod 95 and the pull rod 94 and includes a first fixing member 97, a rotatable adjusting member 98, and a second fixing member 99. The first fixing member 97 is pivotably connected to the float rod 95 at a first pivotal point P1. The second fixing member 99 is pivotably connected to the pull rod 94 at a second pivotal point P2. An example of such a liquid control valve 9 is disclosed in Taiwan Utility Model No. M554183.

When the liquid level in the liquid container drops, the float rod 95 pushes the pull rod 94 to disengage a protrusion 941 of the pull rod 94 from a bottom of the valve rod 92. Thus, the water pressure from the water inlet 9a forces the seal ring 93 to disengage from the flange 911 of the body 91, such that the liquid can be supplied into the liquid container, and the liquid level rises. After the liquid level reaches a predetermined height, the float rod 95 pulls the pull rod 94, such that the protrusion 941 of the pull rod 94 presses against the bottom of the valve rod 92 and such that the seal ring 93 can be in sealing contact with the flange 911, preventing further supply of the liquid into the liquid container.

In use of the liquid container with the conventional liquid control valve 9, when it is desired to change the liquid level, the adjusting member 98 is rotated to adjust the distance between the first pivotal point P1 and the second pivotal point P2. When the distance increases, the liquid level in the liquid container can be higher to increase the amount of liquid stored in the liquid container. On the other hand, when the distance decreases, the liquid level can be lower, such that the amount of liquid stored in the liquid container is reduced. When adjusting the distance between the first pivotal point P1 and the second pivotal point P2 by rotating the adjusting member 98, the travel of the valve rod 92 and the seal ring 93 is changed, and the force imparted by the protrusion 941 of the pull rod 94 to the bottom of the valve rod 92 is varied. When the distance between the first pivotal point P1 and the second pivotal point P2 is too small due to over adjustment of the adjusting member 98, the travel of the valve rod 92 and the seal ring 93 is reduced, such that the seal ring 93 could not be completely disengaged from the flange 911 or could still be in sealing contact with the flange 911 when the liquid level is lowered. As a result, the liquid at the inlet 9a could not rapidly fall or be supplied into the liquid container. On the other hand, when the distance between the first pivotal point P1 and the second pivotal point P2 is too large, the protrusion 941 of the pull rod 94 could not push the valve rod 92 upward to a higher position, such that the seal ring 93 could not be in sealing contact with the flange 911, forming a gap therebetween. Thus, the liquid continuously leaks into the liquid container via the gap.

Furthermore, with reference to FIG. 2, since the protrusion 941 of the pull rod 94 presses against the bottom of the valve rod 92 for a long period of time and since the flange 911 and the seal ring 93 only have a small contact area therebetween, the seal ring 93 will deform due to long-term pressure, such that the seal ring 93 cannot achieve the sealing contact, resulting in a gap through which the liquid leaks into the liquid container.

Thus, improvement to the conventional liquid control valve is required.

SUMMARY OF THE INVENTION

It is therefore an objective of the present invention to provide a liquid control valve having a liquid stopper whose travel is not changed when the liquid level in the liquid container changes, providing the liquid stopper with a better sealing effect.

It is another objective of the present invention to provide an adjusting rod for a liquid control valve. The liquid level can be changed by changing an angle of the adjusting rod.

It is a further objective of the present invention to provide a liquid stopper for a liquid control valve, avoiding deformation and leakage due to long-term use of the liquid stopper.

As used herein, the term "a", "an" or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "coupling", "engagement", "assembly", or similar terms is used to include separation of connected members without destroying the members after connection or inseparable connection of the members after connection. A person having ordinary skill in the art would be able to select according to desired demands in the material or assembly of the members to be connected.

A liquid control valve according to the present invention includes a base, a liquid stopper, an adjusting rod, and a linkage. The base includes a first chamber and a second chamber intercommunicating with the first chamber. An inlet intercommunicates with the first chamber. An outlet intercommunicates with the second chamber. The base further includes an inner face having an upper stop portion. The liquid stopper includes a valve body, a seal, and a guiding member. The valve body is movably received in the first chamber. The seal is located between the valve body and the guiding member. The seal is configured to abut against or disengage from the upper stop portion. The guiding member includes a guiding hole aligned with a slot of the base. The adjusting rod includes fixing arm and an adjusting arm. Each of the fixing arm and the adjusting arm has a first end and a second end opposite to the first end. The first end of the fixing arm is pivotably connected to a first pivotal portion of the base. The second end of the fixing arm and the first end of the adjusting arm are pivotably connected by a conical hole and a cone. The fixing arm includes an intermediate pivotal hole between the first end thereof and the second end thereof. The second end of the adjusting arm is connected to a float. The linkage includes a driving arm and a connecting arm. An end of the driving arm is pivotably connected to an end of the connecting arm. Another end of the driving arm extends through the slot and the guiding hole and is pivotably connected to a second pivotal portion of the base. Another end of the connecting arm is pivotably connected to the intermediate pivotal hole of the fixing arm.

An adjusting rod for a liquid control valve according to the present invention includes a fixing arm and an adjusting arm. The fixing arm has a first end and a second end opposite to the first end. The first end of the fixing arm includes an end pivotal hole. The fixing arm further includes an intermediate pivotal hole between the first end thereof and the second end thereof. The adjusting arm has a first end and a second end opposite to the first end. The first end of the adjusting arm and the second end of the fixing arm are pivotably connected by a conical hole and a cone. The second end of the adjusting arm is connected to a float.

A liquid stopper according to the present invention includes a valve body, a seal, and a guiding member. The valve body includes an anti-leak gasket. The valve body is connected to an end of a rod. Another end of the rod has a threaded portion. The seal includes an upper face and a lower face opposite to the upper face. The seal further includes a central hole extending from the upper face through the lower face. The guiding member includes a first end having a face with a screw hole and a stub. The screw hole is in threading connection with the threaded portion. The stub is received in the central hole. The lower face of the seal abuts against the face of the first end of the guiding member.

Thus, in the liquid control valve and its adjusting rod and its liquid stopper according to the present invention, the adjusting arm is simply rotated relative to the fixing arm during a change of the height of the liquid level, whereas the position of the linkage pivotably connected to the second pivotal portion is not changed, and the angle between the driving arm and the connecting arm is not changed. Thus, the travel of the liquid stopper is not changed, assuring the functions of the liquid stopper in permitting feeding of liquid and achieving sealing contact. Furthermore, in the liquid stopper, in addition to provision of the sealing contact between the lower face of the seal and the face of the first end of the guiding member, the seal and the guiding member can be in sealing contact with each other by the first and third stop portions and the second and fourth stop portions, providing multiple sealing contacts to thereby achieve the best sealing effect and the best leakage-prevention effect while preventing leakage from the first chamber into the second chamber.

In an example, the base is comprised of an upper base and a lower base coupled to the upper base. Thus, the liquid stopper can be easily assembled to the base.

In an example, a face of the cone contacts with a face of the conical hole, and at least one of the faces of the cone and the conical hole has an anti-slip portion. Thus, the adjusting arm and the fixing arm are more securely connected to prevent the adjusting arm and the fixing arm from becoming loosened.

In an example, a face of the cone contacts with a face of the conical hole. One of the faces of the cone and the conical hole has teeth. Another of the faces of the cone and the conical hole has grooves meshed with the teeth. Thus, the adjusting arm and the fixing arm are more securely connected to prevent the adjusting arm and the fixing arm from becoming loosened.

In an example of the liquid control valve or its liquid stopper, a rod is connected to the valve body and includes a threaded portion. The first end of the guiding member has a screw hole in threading connection with the threaded portion. The seal includes an upper face configured to abut against or disengage from the upper stop portion. The seal includes a lower face having a first stop portion and a second stop portion. A face of the first end of the guiding member is formed with a groove and has a third stop portion and a fourth stop portion. The first stop portion is in sealing contact with the third stop portion. The second stop portion is in sealing contact with the fourth stop portion. Thus, the liquid stopper can be easily assembled. Furthermore, the seal and the guiding member have multiple sealing contacts therebetween, achieving excellent sealing contact and avoiding leakage.

In an example of the liquid control valve or its liquid stopper, one of the first stop portion and the third stop portion is a conical wall, and another of the first stop portion and the third stop portion is a conical groove matching with the conical wall. Thus, the seal and the guiding member have a better sealing contact therebetween and can avoid leakage.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
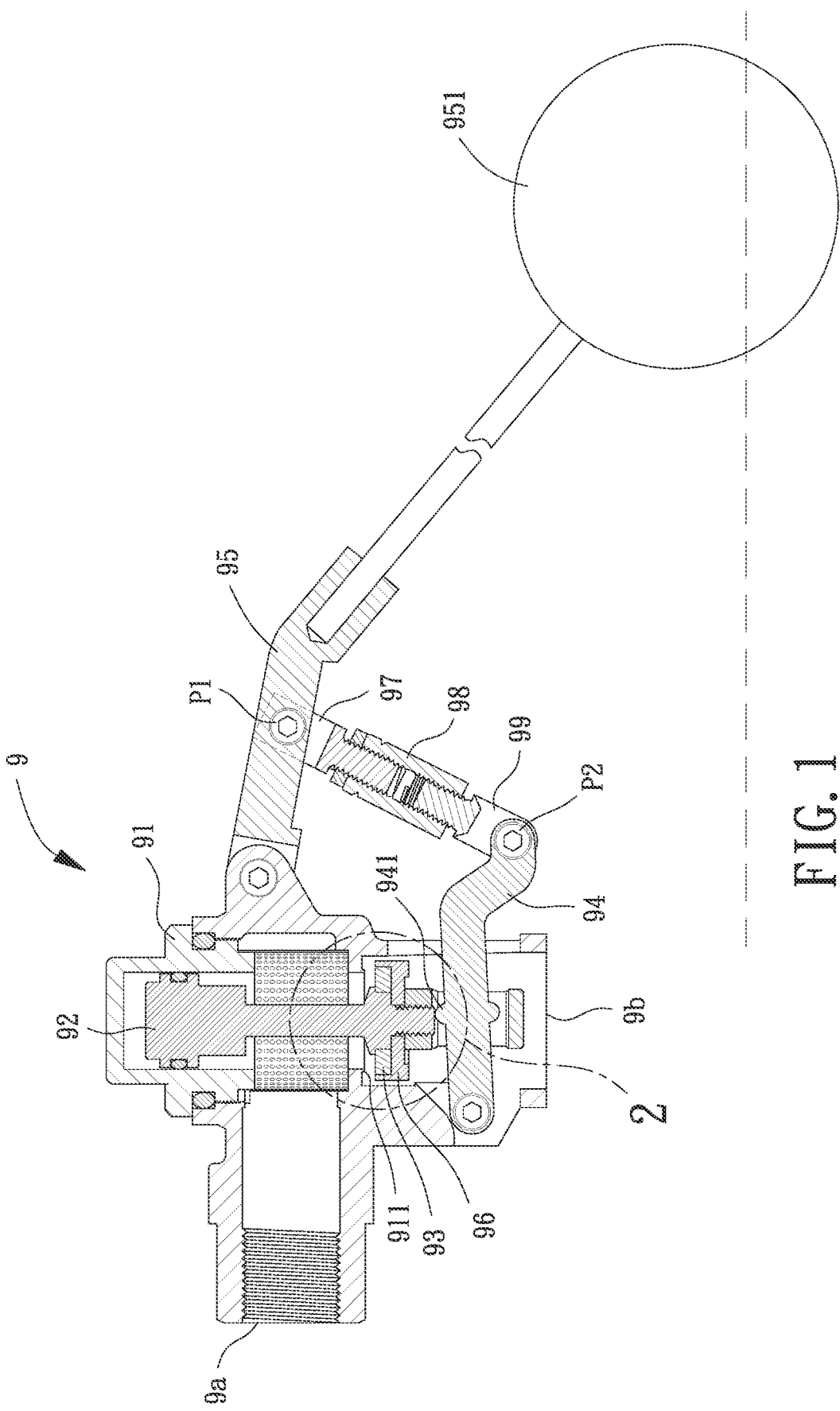
FIG. 1 is a cross sectional view of a conventional liquid control valve.
Figure 2:
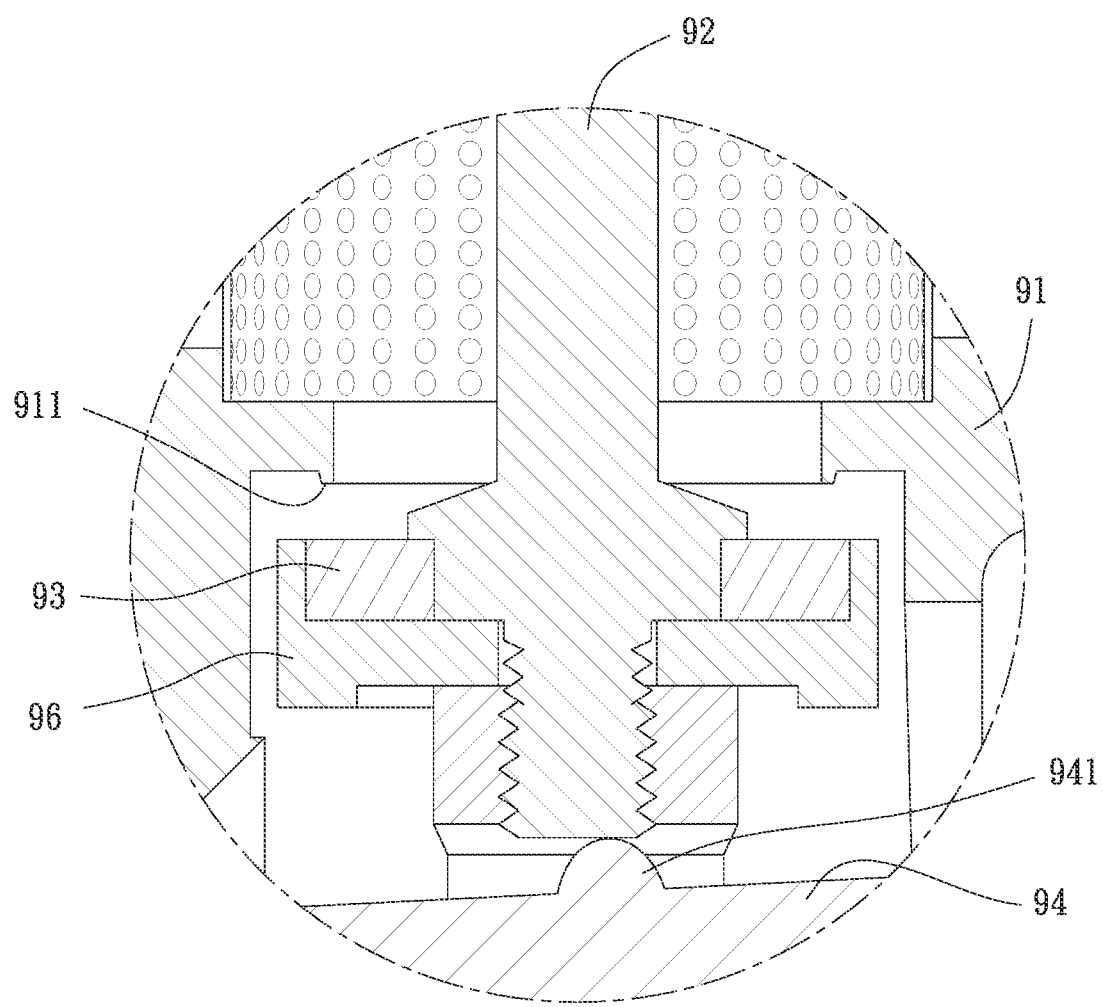
FIG. 2 is an enlarged view of a circled portion of FIG. 1.

In the various figures of the drawings, the same numerals designate the same or similar parts. Furthermore, when the terms "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 3:
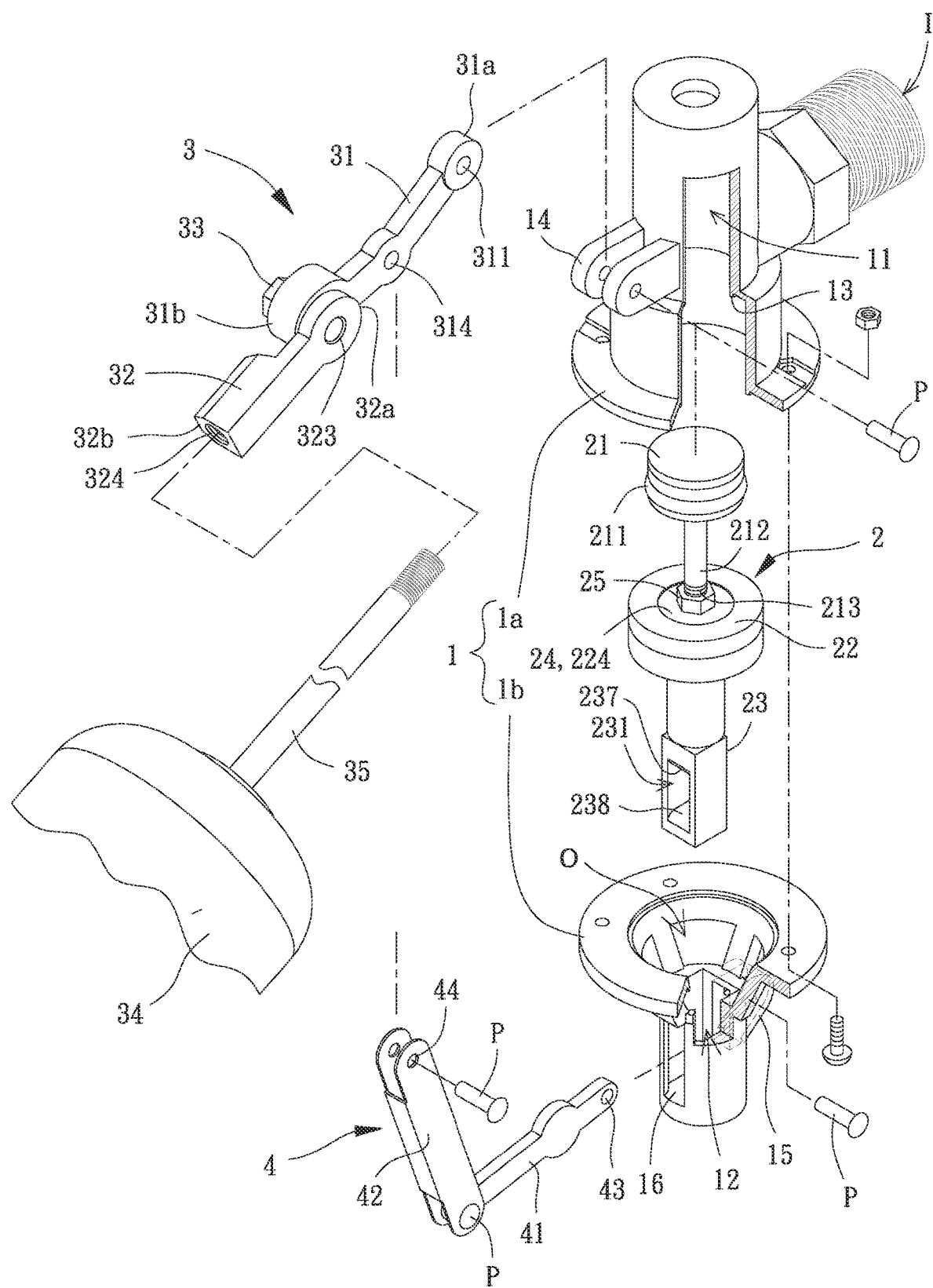
FIG. 3 is an exploded, perspective view of a liquid control valve of an embodiment according to the present invention.

With reference to FIG. 3, a liquid control valve of an embodiment according to the present invention includes a base 1, a liquid stopper 2, an adjusting rod 3, and a linkage 4. The liquid stopper 2 is received in the base 1. An end of the adjusting rod 3 and an end of the linkage 4 are pivotably connected to the base 1. The adjusting rod 3 can actuate the linkage 4 which, in turn, pushes the liquid stopper 2 to move.

Figure 4:
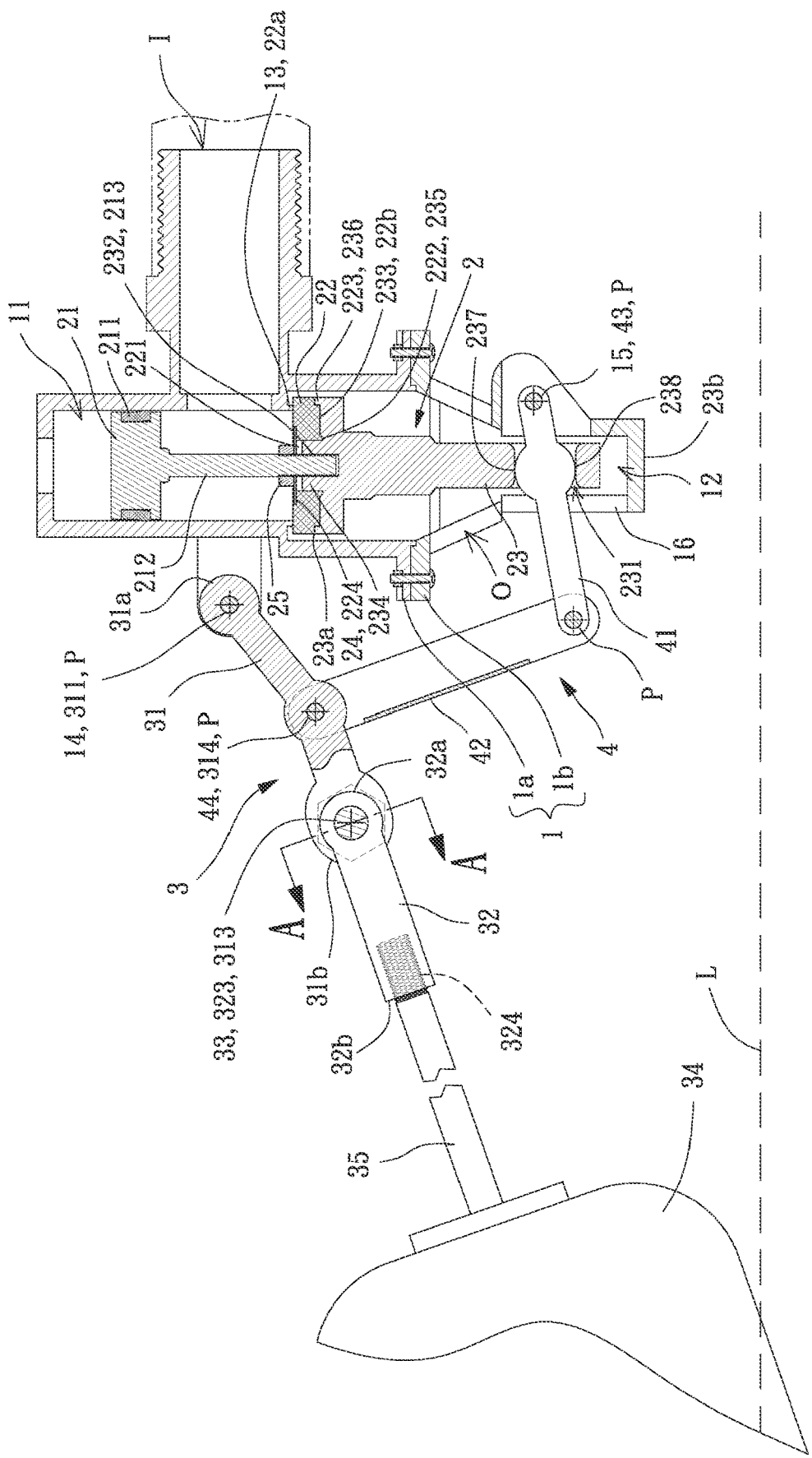
FIG. 4 is a cross sectional view of the liquid control valve of the embodiment according to the present invention after assembly.

With reference to FIGS. 3 and 4, the base 1 can be integral or comprised of a plurality of components. The present invention is not limited in this regard. In this embodiment, the base 1 is comprised of an upper base 1a and a lower base 1b coupled to the upper base 1a. The coupling can be male/female coupling, snapping, or threading connection. The base 1 includes a first chamber 11 and a second chamber 12 intercommunicating with the first chamber 11. An inlet I intercommunicates with the first chamber 11. The inlet I can be connected to a fluid source (not shown), permitting the fluid to be guided into the first chamber 11. The base 1 further includes an inner face having an upper stop portion 13. The upper stop portion 13 can be in the form of an annular protrusion on the inner face of the base 1, such that the upper stop portion 13 forms an annular ring in the first chamber 11. At least one outlet O intercommunicates with the second chamber 12 and is configured to guide the liquid in the second chamber 12 outward. Preferably, the at least one outlet O includes a plurality of outlets O. The base 1 further includes a first pivotal portion 14 and a second pivotal portion 15. An end of the adjusting rod 3 is pivotably connected to the first pivotal portion 14 by a pivot P. An end of the linkage 4 is pivotably connected to the second pivotal portion 15 by a pivot P.

With the reference to FIGS. 3 and 4, the liquid stopper 2 is movably received in the first chamber 11 and the second chamber 12 of the base 1. The liquid stopper 2 includes a valve body 21, a seal 22, and a guiding member 23. The valve body 21, the seal 22, and the guiding member 23 can be integral or comprised of a plurality of components. The present invention is not limited in this regard. The valve body 21 is movably received in the first chamber 11. The seal 22 is located between the valve body 21 and the guiding member 23. The seal 22 can be made of elastic materials such as rubber or silicone rubber. The seal 22 can abut against the upper stop portion 13 to interrupt intercommunication between the first chamber 11 and the second chamber 12, such that the fluid guided from the inlet I into the first chamber 11 will not enter the second chamber 12. The guiding member 23 includes a guiding hole 231 extending through two opposite sides of the guiding member 23 and aligned with a slot 16 of the base 1, permitting the linkage 4 to extend therethrough. Furthermore, the linkage 4 can actuate the guiding member 23 to move in the second chamber 12.

Figure 6:
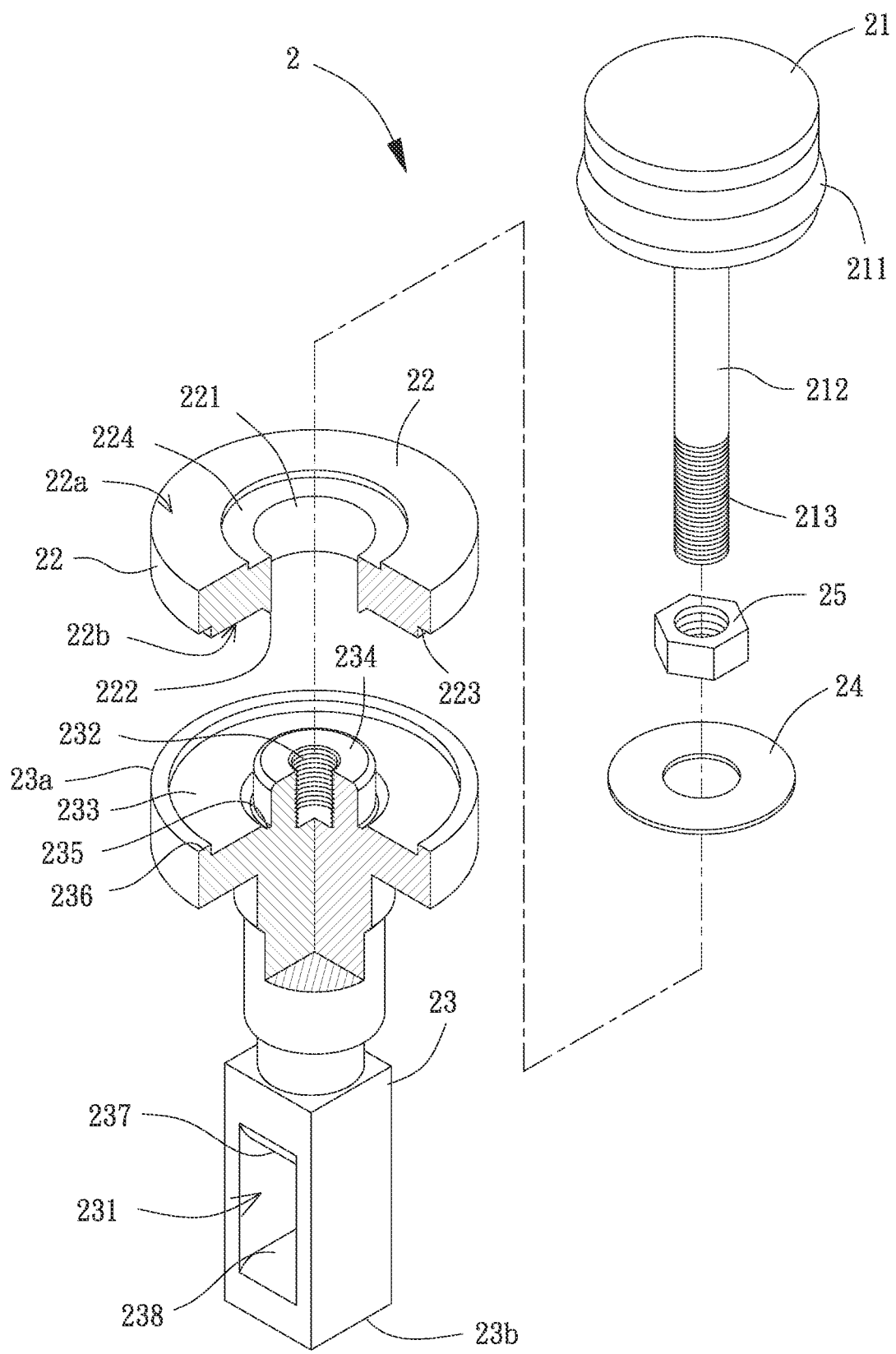
FIG. 6 is an exploded, perspective view of a liquid stopper according to the present invention.
Figure 7:
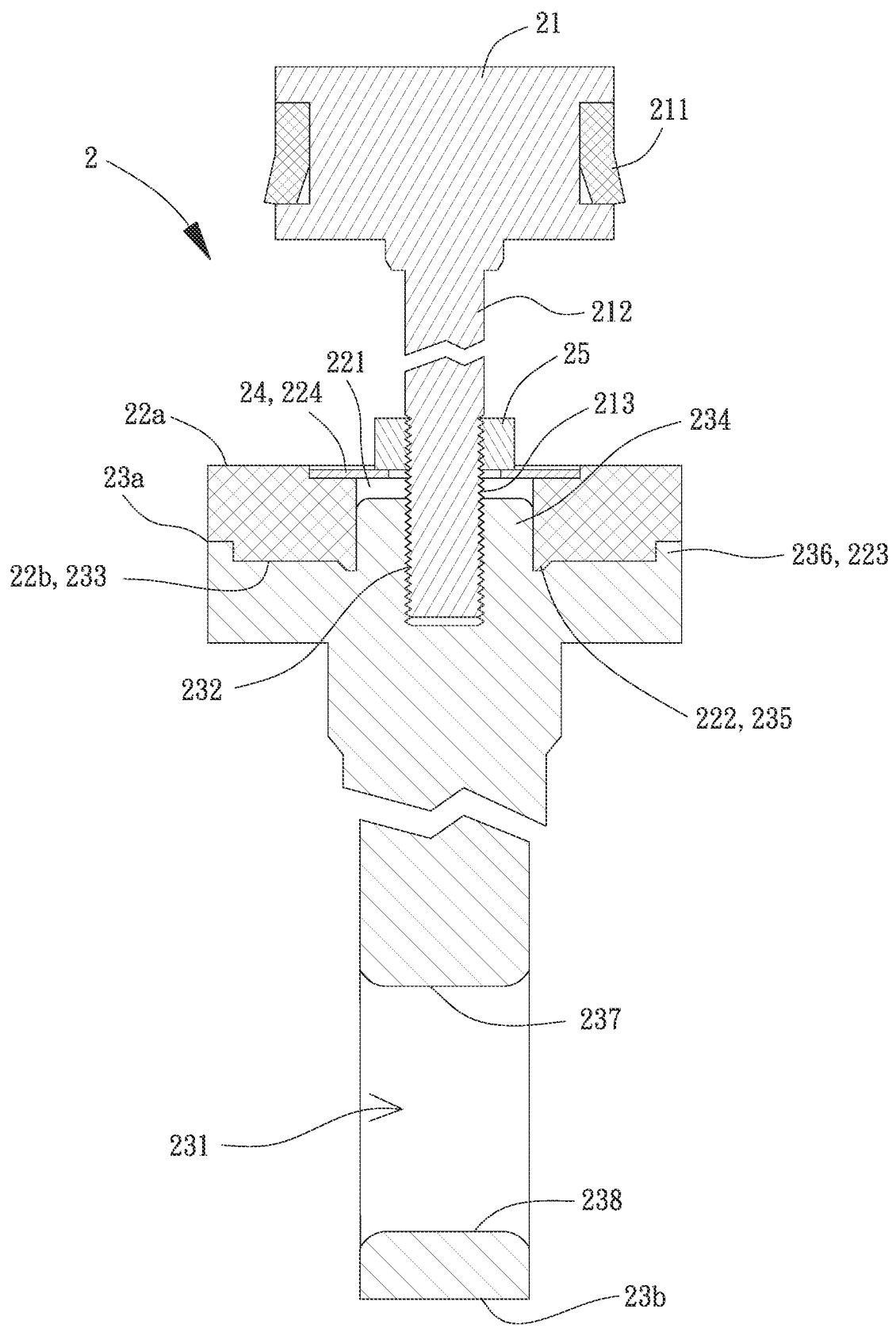
FIG. 7 is a cross sectional view of the liquid stopper according to the present invention after assembly.

With reference to FIGS. 6 and 7, in a preferred embodiment, the liquid stopper 2 can be comprised of the valve body 21, the seal 22, and the guiding member 23, which are separate and can be coupled together. The valve body 21 can have an anti-leak gasket 211 which can be in sealing contact with a housing wall of the first chamber 11 to provide a better sealing effect. The valve 21 is connected to a rod 212 having a threaded portion 213. The first end 23a of the guiding member 23 has a screw hole 232 in threading connection with the threaded portion 213.

The seal 22 includes an upper face 22a and a lower face 22b opposite to the upper face 22a. The seal 22 further includes a central hole 221 extending from the upper face 22a through the lower face 22b. A face of the first end 23a of the guiding member 23 has a stub 234. The stub 234 is received in the central hole 221 of the seal 22, such that the lower face 22b of the seal 22 can abut against the face of the first end 23a of the guiding member 23. Preferably, the upper face 22a of the seal 22 is recessed to form a countersink 224 for receiving a washer 24. A nut 25 is threadedly coupled with the threaded portion 213, such that the lower face 22b of the seal 22 and the face of the first end 23a of the guiding member 23 have tighter sealing contact therebetween.

Preferably, the lower face 22b of the seal 22 has a first stop portion 222 and a second stop portion 223. The face of the first end 23a of the guiding member 23 may be formed with a groove 233 and may have a third stop portion 235 and a fourth stop portion 236. The first stop portion 222 is in sealing contact with the third stop portion 235. The second stop portion 223 is in sealing contact with the fourth stop portion 236. In this embodiment, one of the first stop portion 222 and the third stop portion 235 is a conical wall, and another of the first stop portion 222 and the third stop portion 235 is a conical groove matching with the conical wall. One of the second stop portion 223 and the fourth stop portion 226 is an annular groove, and another of the second stop portion 223 and the fourth stop portion 226 is a flange matching with the annular groove. Thus, in addition to the sealing contact between the lower face 22b of the seal 22 and the face of the first end 23a of the guiding member 23, the seal 22 and the guiding member 23 can be in sealing contact with each other by the first and third stop portions 222 and 235 and the second and fourth stop portions 223 and 236, providing multiple sealing contacts to thereby achieve tight sealing contact and a leakage-prevention effect.

The guiding member 23 can be received in the second chamber 12 of the base 1 by the second end 23b. The second end 23b of the guiding member 23 includes a guiding hole 231 extending through two opposite sides of the guiding member 23 and aligned with the slot 16 of the base 1, permitting the linkage 4 to extend therethrough. The guiding hole 231 includes an upper abutting portion 237 and a lower abutting portion 238.

Figure 8:
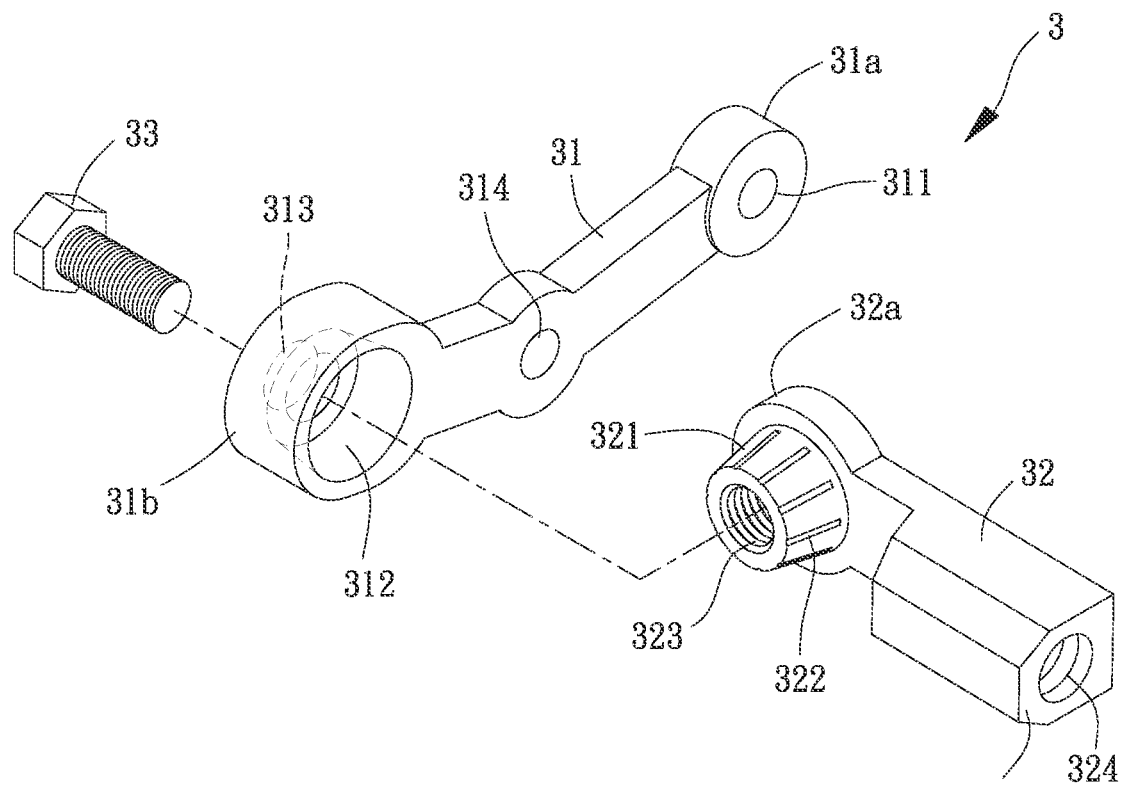
FIG. 8 is an exploded, perspective view of an adjusting rod according to the present invention.
Figure 9:
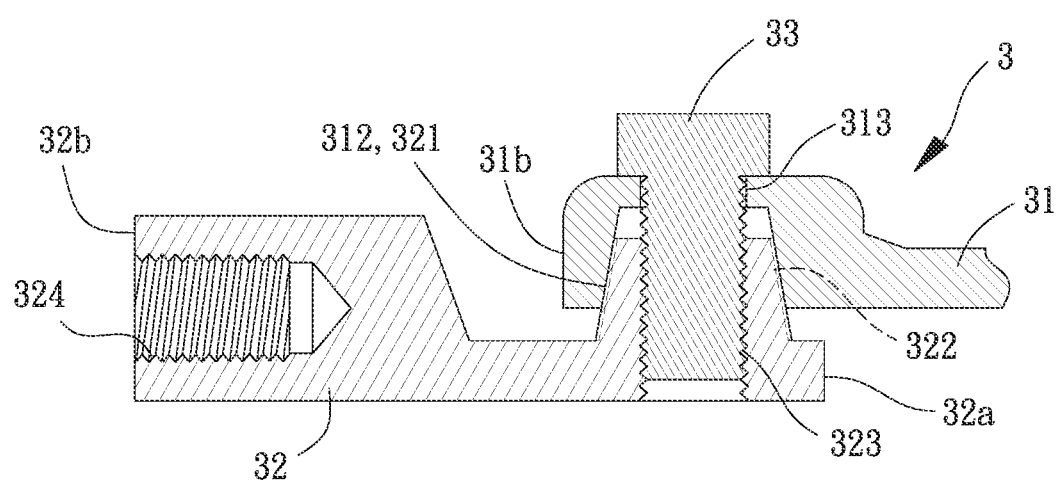
FIG. 9 is a cross sectional view of the adjusting rod according to the present invention after assembly.

With reference to FIGS. 3, 4, and 8, the adjusting rod 3 includes a fixing arm 31 and an adjusting arm 32. Each of the fixing arm 31 and the adjusting arm 32 has a first end 31a, 32a and a second end 31b, 32b opposite to the first end 31a, 32a. The first end 31a of the fixing arm 31 includes an end pivotal hole 311 which is pivotably connected to the first pivotal portion 14 of the base 1 by a pivot P. The second end 31b of the fixing arm 31 and the first end 32a of the adjusting arm 32 are pivotably connected by a conical hole and a cone. In this embodiment, the second end 31b of the fixing arm 31 includes a conical hole 312 and a through-hole 313 concentric to the conical hole 312. The through-hole 313 extends through a face of the fixing arm 31. The fixing arm 31 further includes an intermediate pivotal hole 314 between the first end 31a thereof and the second end 32a thereof.

The first end 32a of the adjusting arm 32 has a cone 321 protruding therefrom. The cone 321 matches with the conical hole 312. Preferably, the cone 321 and the conical hole 312 have the same conicity. A face of the cone 321 contacts with a face of the conical hole 312. At least one of the faces of the cone 321 and the conical hole 312 has an anti-slip portion 322. Alternatively, one of the faces of the cone 321 and the conical hole 312 has teeth, and another of the faces of the cone 321 and the conical hole 312 has grooves meshed with the teeth. Thus, after the fixing arm 31 and the adjusting arm 32 are coupled together, the fixing arm 31 and the adjusting arm 32 will not pivot relative to each other. The cone 321 has a screw hole 323. A threaded member 33 can extend through the through-hole 313 to threadedly couple with the screw hole 323, such that the second end 31b of the fixing arm 31 and the first end 32a of the adjusting arm 32 are in a fixed relation to each other. Furthermore, a user can loosen the threaded member 33 to adjust the angle between the fixing arm 31 and the adjusting arm 32. The second end 32b of the adjusting arm 32 has a connecting portion 324, and a float 34 can be directly or indirectly connected to the adjusting arm 32. In this embodiment, the float 34 is indirectly connected to the adjusting arm 32 by a rod 35.

The above coupling between the second end 31b of the fixing arm 31 and the first end 32a of the adjusting arm 32 is merely an example. The second end 31b of the fixing arm 31 can be modified to include a screw hole similar to the screw hole 323 of the cone 321 of the adjusting arm 32, whereas the first end 32a of the adjusting arm 32 can be modified to include a conical hole and a through-hole similar to the conical hole 312 and the through-hole 313 of the fixing arm 31. The same function and effect can be provided. The present invention is not limited in this regard.

With reference to FIGS. 3 and 4, the linkage 4 includes a driving arm 41 and a connecting arm 42. An end of the driving arm 41 is pivotably connected to an end of the connecting arm 42 by a pivot P. Another end of the driving arm 41 extends through the slot 16 and the guiding hole 231. The extending end of the driving arm 41 has a first end pivotal hole 43 pivotably connected to the second pivotal portion 15 of the base 1 by a pivot P. Another end of the connecting arm 42 has a second end pivotal hole 44 pivotably connected to the intermediate pivotal hole 314 of the fixing arm 31 by a pivot P.

With reference to FIG. 4, the liquid control valve according to the present invention can be used in an interior of a liquid container (not shown). The liquid control valve is used to stop or permit flow of a liquid. The float 34 of the adjusting rod 3 can float on the liquid level of the liquid. The height of the float 34 can be increased in response to a rise of the liquid level L. The float 34 actuates the adjusting rod 3 to pivot in the clockwise direction (as viewed from the drawing sheet) about the first pivot portion 14 of the base 1 pivotably connected to the adjusting rod 3. At the same time, the adjusting rod 3 actuates the driving arm 41 via the connecting rod 42 pivotably connected to the adjusting rod 3, such that the driving arm 41 also pivots in the clockwise direction about the second pivotal portion 15. Thus, the driving arm 41 can abut against the upper abutting portion 237 of the liquid stopper 2 to move the liquid stopper 2 upward (as viewed from the drawing sheet). When the upper face 22a of the seal 2 abuts against the upper stop portion 13 of the base 1, the liquid stopper 2 interrupts the intercommunication between the first chamber 11 and the second chamber 12, stopping the liquid from flowing into the liquid container. Furthermore, in addition to the sealing contact between the lower face 22b of the seal 22 and the face of the first end 23a of the guiding member 23, the seal 22 and the guiding member 23 can be in sealing contact with each other by the first and third stop portions 222 and 235 and the second and fourth stop portions 223 and 236, providing multiple sealing contacts to thereby achieve the best sealing effect and the best leakage-prevention effect.

Figure 5:
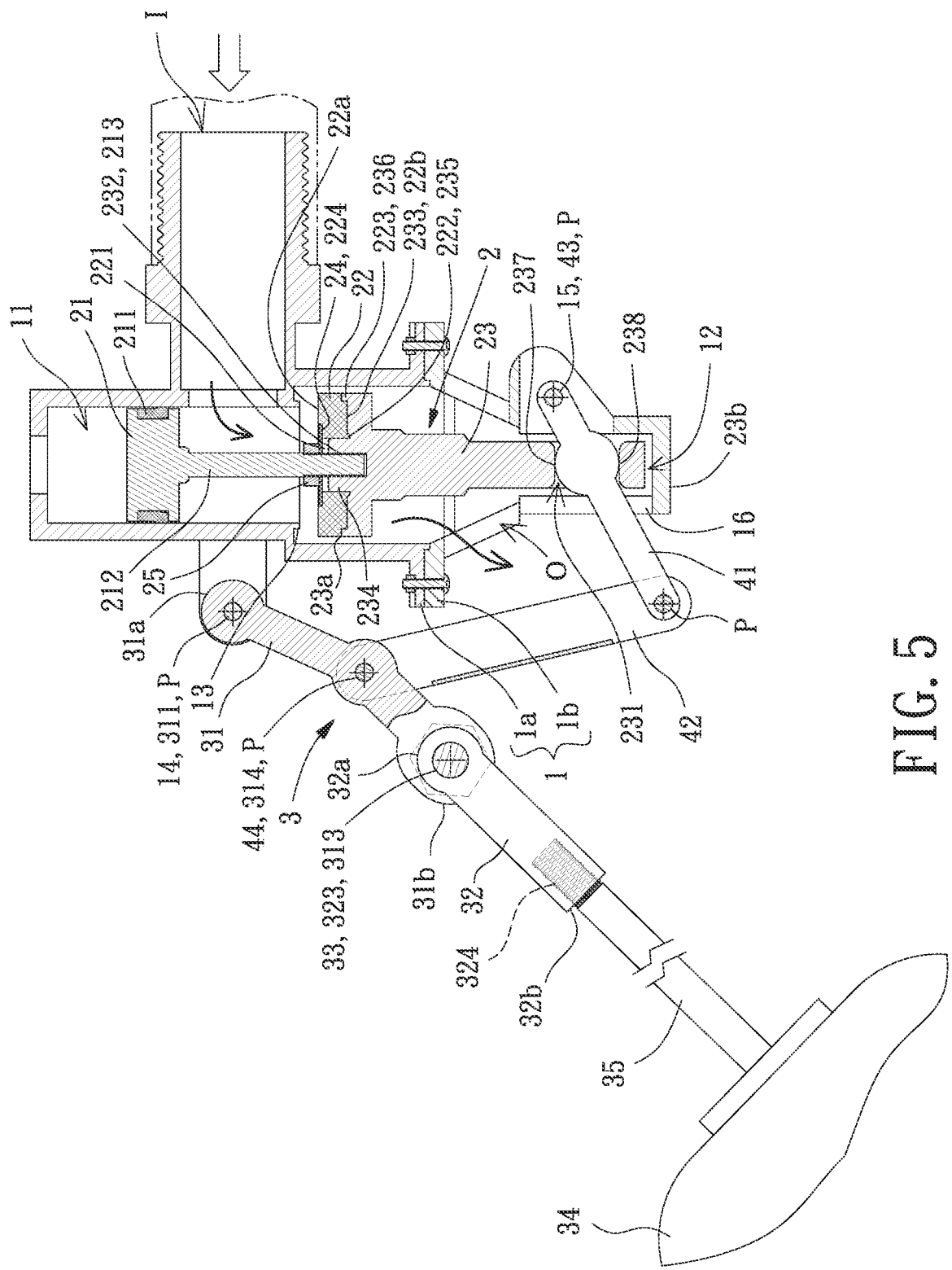
FIG. 5 is a view similar to FIG. 4, illustrating operation of the liquid control valve.

With reference to FIG. 5, when the height of the float 34 is reduced in response to a drop in the liquid level L, the adjusting rod 3 pivots in the counterclockwise direction (as viewed from the drawing sheet) about the first pivotal portion 14 of the base 1 pivotably connected to the adjusting rod 3. At the same time, the adjusting rod 3 actuates the driving arm 41 via the connecting rod 42 pivotably connected to the adjusting rod 3, such that the driving arm 41 also pivots in the counterclockwise direction about the second pivotal portion 15. Thus, the driving arm 41 can abut against the lower abutting portion 238 of the liquid stopper 2 to move the liquid stopper 2 downward (as viewed from the drawing sheet). When the upper face 22a of the seal 22 disengages from the upper stop portion 13 of the base 1, the first chamber 11 and the second chamber 12 of the base 1 intercommunicate with each other, permitting the liquid to flow into the liquid container.

Figure 10:
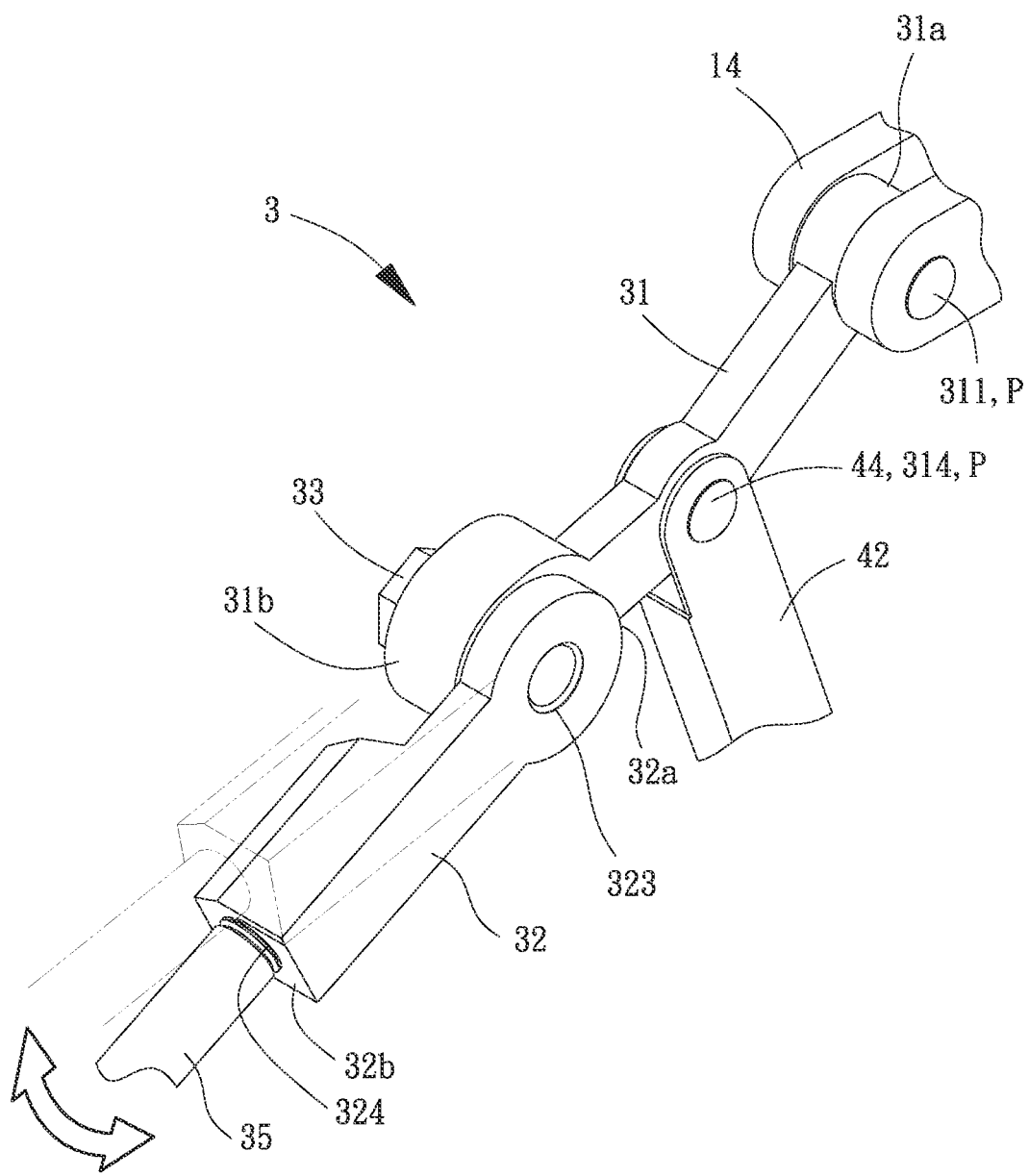
FIG. 10 is a perspective view of the adjusting rod according to the present invention after assembly.

With reference to FIGS. 8 and 10, when the user intends to change the height of the liquid level L of the liquid in the liquid container, the threaded member 33 is loosened to permit a change in the angle between the adjusting arm 32 and the fixing aim 31 to thereby change the liquid level L. In the example shown in FIG. 4, the adjusting rod 32 is rotated clockwise relative to the fixing arm 31 to increase the height of the liquid level L. On the other hand, the adjusting rod 32 can be rotated counterclockwise relative to the fixing arm 31 to reduce the height of the liquid level L. While changing the angle between the adjusting arm 32 and the fixing arm 31, the adjusting rod 3 is adjusted by simply rotating the adjusting arm 32 relative to the fixing arm 31, such that the linkage 4 pivotably connected to the second pivotal portion 15 does not pivot. Thus, the angle between the driving arm 41 and the connecting arm 42 is not changed, avoiding a change in the travel of the liquid stopper 2.

In view of the foregoing, in the liquid control valve and its adjusting rod and its liquid stopper according to the present invention, the adjusting arm is simply rotated relative to the fixing arm during a change of the height of the liquid level, whereas the position of the linkage pivotably connected to the second pivotal portion is not changed, and the angle between the driving arm and the connecting arm is not changed. Thus, the travel of the liquid stopper is not changed, assuring the functions of the liquid stopper in permitting feeding of liquid and achieving sealing contact. Furthermore, in the liquid stopper, in addition to provision of the sealing contact between the lower face of the seal and the face of the first end of the guiding member, the seal and the guiding member can be in sealing contact with each other by the first and third stop portions and the second and fourth stop portions, providing multiple sealing contacts to thereby achieve the best sealing effect and the best leakage-prevention effect while preventing leakage from the first chamber into the second chamber.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A liquid control valve comprising:
   a base including a first chamber and a second chamber intercommunicating with the first chamber, wherein an inlet intercommunicates with the first chamber, wherein an outlet intercommunicates with the second chamber, and wherein the base further includes an inner face having an upper stop portion;
   a liquid stopper including a valve body, a seal, and a guiding member, wherein the valve body is movably received in the first chamber, wherein the seal is located between the valve body and the guiding member, wherein the seal is configured to abut against or disengage from the upper stop portion, and wherein the guiding member includes a guiding hole aligned with a slot of the base;
   an adjusting rod including a fixing arm and an adjusting arm, wherein each of the fixing arm and the adjusting arm has a first end and a second end opposite to the first end, wherein the first end of the fixing arm is pivotably connected to a first pivotal portion of the base, wherein the second end of the fixing arm and the first end of the adjusting arm are pivotably connected by a conical hole and a cone, wherein the fixing arm includes an intermediate pivotal hole between the first end thereof and the second end thereof, and wherein the second end of the adjusting arm is connected to a float; and a linkage including a driving arm and a connecting arm, wherein an end of the driving arm is pivotably connected to an end of the connecting arm, wherein another end of the driving arm extends through the slot and the guiding hole and is pivotably connected to a second pivotal portion of the base, and wherein another end of the connecting arm is pivotably connected to the intermediate pivotal hole of the fixing arm.

2. The liquid control valve as claimed in claim 1, wherein the base is comprised of an upper base and a lower base coupled to the upper base.

3. The liquid control valve as claimed in claim 1, wherein a face of the cone contacts with a face of the conical hole, and wherein at least one of the faces of the cone and the conical hole has an anti-slip portion.

4. The liquid control valve as claimed in claim 1, wherein a face of the cone contacts with a face of the conical hole, wherein one of the faces of the cone and the conical hole has teeth, and wherein another of the faces of the cone and the conical hole has grooves meshed with the teeth.

5. The liquid control valve as claimed in claim 1, wherein a rod is connected to the valve body and includes a threaded portion, wherein the first end of the guiding member has a screw hole in threading connection with the threaded portion, wherein the seal includes an upper face configured to abut against or disengage from the upper stop portion, wherein the seal includes a lower face having a first stop portion and a second stop portion, wherein a face of the first end of the guiding member is formed with a groove and has a third stop portion and a fourth stop portion, wherein the first stop portion is in sealing contact with the third stop portion, and wherein the second stop portion is in sealing contact with the fourth stop portion.

6. An adjusting rod for a liquid control valve, comprising:
a fixing arm having a first end and a second end opposite to the first end, wherein the first end of the fixing arm includes an end pivotal hole, and wherein the fixing arm further includes an intermediate pivotal hole between the first end thereof and the second end thereof; and an adjusting arm having a first end and a second end opposite to the first end, wherein the first end of the adjusting arm and the second end of the fixing arm are pivotably connected by a conical hole and a cone, and wherein the second end of the adjusting arm is connected to a float.

7. The adjusting rod for the liquid control valve as claimed in claim 6, wherein a face of the cone contacts with a face of the conical hole, and wherein at least one of the faces of the cone and the conical hole has an anti-slip portion.

8. The adjusting rod for the liquid control valve as claimed in claim 6, wherein a face of the cone contacts with a face of the conical hole, wherein one of the faces of the cone and the conical hole has teeth, and wherein another of the faces of the cone and the conical hole has grooves meshed with the teeth.

9. A liquid stopper for the liquid control valve comprising:
a valve body including an anti-leak gasket, wherein the valve body is connected to an end of a rod, and wherein another end of the rod has a threaded portion;

a seal including an upper face and a lower face opposite to the upper face, and wherein the seal further includes a central hole extending from the upper face through the lower face; and a guiding member including a first end having a face with a screw hole and a stub, wherein the screw hole is in threading connection with the threaded portion, wherein the stub is received in the central hole, and wherein the lower face of the seal abuts against the face of the first end of the guiding member, wherein the lower face of the seal includes a first stop portion and a second stop portion, wherein the face of the first end of the guiding member is formed with a groove and has a third stop portion and a fourth stop portion, wherein the first stop portion is in sealing contact with the third stop portion, and wherein the second stop portion is in sealing contact with the fourth stop portion.

10. The liquid stopper for the liquid control valve as claimed in claim 9, wherein one of the first stop portion and the third stop portion is a conical wall, and wherein another of the first stop portion and the third stop portion is a conical groove matching with the conical wall.

* * * * *